Feb. 23, 1965

J. W. RIDDEL 3,171,019

TEMPERATURE CONTROL SYSTEM

Filed April 26, 1961

INVENTOR.
John W. Riddel
BY
Paul J. Ethington
ATTORNEY

United States Patent Office 3,171,019
Patented Feb. 23, 1965

3,171,019
TEMPERATURE CONTROL SYSTEM
John W. Riddel, Fenton, Mich., assignor to General Motors Corporation, Detroit, Mich., a corporation of Delaware
Filed Apr. 26, 1961, Ser. No. 105,639
18 Claims. (Cl. 219—519)

This invention relates to a heat control system and more particularly to a temperature sensitive relay circuit containing thermistors.

Frequently it is desirable in temperature control systems to utilize a temperature sensitive circuit to control a relay wherein the relay in turn controls a heating element. It has been previously proposed to utilize thermistors in the relay circuit to vary the resistance of the circuit and hence vary the voltage or current applied to the relay according to the temperature at which the thermistors are subject. However, where it is desired to attain a very small range of temperature variation, the problem arises that a large change of resistance of the relay circuit must occur within the small temperature range in order to change the relay voltage from that sufficient to open the relay contacts to that sufficient to close the relay contacts. For example, a particular relay may have a coil resistance of 500 ohms and require 9 volts to pull in the relay armature and does not permit the armature to drop out until the voltage drops to 4 volts. It is obvious that a very substantial change in the resistance of the circuit must occur in order to undergo a complete cycle of relay operation. Even by using the most advanced thermistors, it is not possible to obtain sufficient change of resistance within a narrow temperature range merely by the temperature effects on the resistance of the thermistor.

The purpose of this invention is to provide a temperature sensitive thermistorized relay circuit which is operative within a narrow temperature range to operate a relay through this entire cycle thereby to control an associated heating element.

The invention is carried out by providing at least one thermistor in a relay circuit to control the resistance of the circuit according to the temperature at which the thermistors are subjected, and an additional resistance element inserted into or removed from the circuit upon actuation of the relay to thereby achieve the major portion of the required circuit resistance change for permitting a subsequent actuation of the relay.

The above and other advantages of the invention will be made more apparent from the following specification taken in conjunction with the accompanying drawings wherein like numerals refer to like parts, and wherein.

Figure 1:
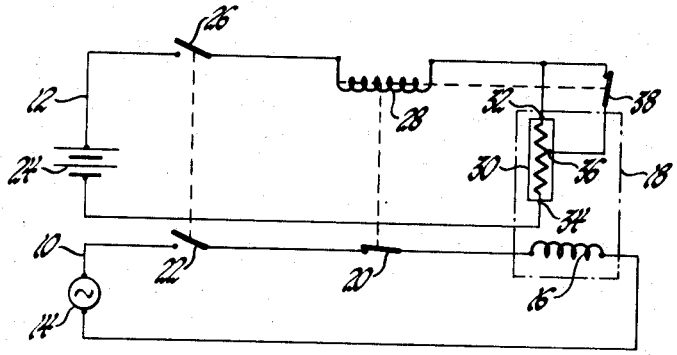
FIGURE 1 is a schematic electrical diagram of a thermistor operated relay circuit and associated heating control circuit according to the invention.

As shown in FIGURE 1 of the drawings, a temperature control system comprises a heater circuit 10 and a temperature sensitive control circuit 12. The heater circuit 10 comprises a power supply 14 of the A.C. or D.C. type, an electrical heating coil 16 within an enclosure 18 the temperature of which is to be regulated, normally closed relay contacts 20, and a manually operated switch 22 all connected in series. It is obvious that when the contacts 20 and the switch 22 are closed, the current will flow through the heating coil 16 and heating of the enclosure 18 will result.

The temperature sensitive control circuit 12 includes a D.C. power source 24, a switch 26 mechanically connected to the manually operable switch 22 of the heating circuit 10, a relay coil 28 in series therewith, and a three-terminal thermistor 30 having its end terminals 32 and 34 connected in series with the previously mentioned elements. If desired, the three-terminal thermistor 30 may be replaced by two ordinary thermistors connected in series. The center terminal 36 of the three-terminal thermistor 30 is connected to the first terminal 32 of the thermistor 30 through a set of normally closed relay contacts 38 operable by the relay coil 28. Hence it is seen that the first section of the thermistor between the first terminal 32 and the center terminal 36 will be shunted out by the relay contacts 38 when the relay coil 28 is de-energized, but that the said first section of the thermistor 30 will be in series with the remainder of the circuit when the relay contacts are opened upon energization of the relay. In the present instance, the thermistors have a negative temperature coefficient of resistance so that as the temperature of the enclosure 18 rises, the thermistor temperature will rise and the resistance thereof will decrease.

In operation, when the manually operable switches 22, 26 are closed, the heating coil 16 will begin to heat the enclosure 18. Meanwhile, in the temperature control circuit 12 current will flow through the second section of the thermistor 30 between terminals 34 and 36, through the closed relay contacts 38 and the relay coil 28. The circuit parameters are chosen so that initially the current flowing through the circuit is insufficient to energize the relay coil 28. However, when the maximum desired temperature in the enclosure 19 is reached the resistance of the second section of the thermistor will have decreased so as to permit sufficient current flow through the relay coil to cause both sets of relay contacts 20, 38 to open and interrupt the current through the heating coil 16. When the relay contacts 38 in the control circuit 12 are opened, the first section of the thermistor 30 is connected in series with the second section thereof so that the relay current immediately drops to a value which is just sufficient to hold the contacts open. Subsequent cooling of the enclosure 18 resulting from the interruption of the heating circuit 10 will allow the thermistor 30 to cool and to increase in resistance until the minimum point in the temperature range is reached, at which time the current through the circuit 12 will be sufficiently low to permit the relay contacts 20, 38 to close thereby initiating another heating cycle.

Successful operation of this system has been obtained by using inexpensive components and yet obtaining sensitive temperature control. One of the major advantages of this circuit is that the range of temperature control is only slightly affected by changes in the power supply voltage. A specific example of an embodiment of the circuit of FIGURE 1 comprised a thermistor 30 having a resistance of about 230 ohms in its first section and 60 ohms in its second section at control temperature. The relay coil resistance was 500 ohms and required 9 volts to open the relay contacts and 4 volts to permit the contacts to close. Using a 12-volt storage battery as the power supply, a range of control of 510° to 540° C. was obtained.

It is possible to obtain an operable circuit by substituting an ordinary resistor for the first section of the thermistor 30. Hence it will achieve the necessary voltage drop upon opening of the relay contacts 38. However, a circuit of that type is much less sensitive than the preferred embodiment described since the use of the first section of the thermistor 30 permits a greater change of resistance with temperature during that part of the cycle when the relay contacts are open.

Figure 2:
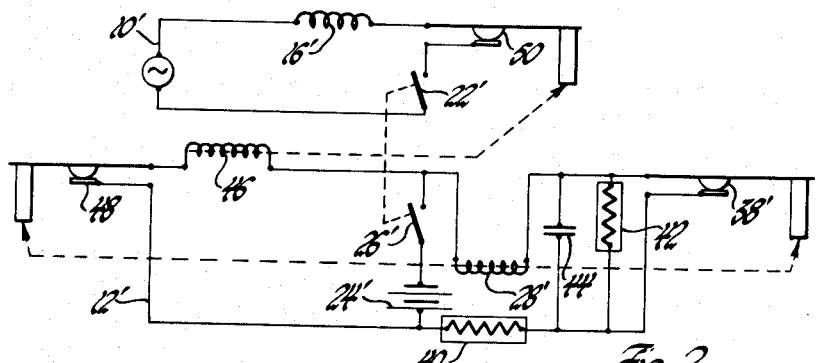
FIGURE 2 is a circuit diagram of a modification of the circuit of FIGURE 1 according to the invention.

FIGURE 2 depicts a system very similar to that of FIGURE 1, and hence, only the differences will be explained in detail. Although the thermistors are intended to be subject to the temperature of an enclosure heated by heating element 16', as in FIGURE 1, no enclosure is illustrated. Two separate thermistors 40 and 42 are shown instead of the three-terminal thermistor of FIGURE 1. A large capacitor 44 is connected across the second thermistor 42 to delay the voltage change on the relay coil. This added feature will prevent the vibration of the relay contacts which might occur if the voltage across the relay falls to a low value before the moving contact has shifted to its fully open position. Other means to accomplish the same purpose are to use a delay slug in the relay coil to slow the magnetic force changes or to use an over-center contact arm arrangement. Rather than have the heating circuit controlled directly by contacts on the relay, it is now proposed to operate a power relay 46 connected in series with the D.C. power supply 24' and the normally closed contacts 48 of the sensitive relay 28'. The power relay 46 in turn operates contacts 50 in the heating circuit 10'. The advantage of this modification is readily apparent in that a small sensitive relay desirable for use in the temperature control circuit 12' would not be strong enough to operate large high pressure contacts suitable for carrying heating current to the heater element 28'. Hence the combination of the sensitive relay 28' with a power relay 46 achieves optimum performance in both the temperature control circuit 12' and the heater circuit 10'. The operation of the temperature control portion of this circuit is substantially identical to that of the circuit of FIGURE 1.

Figure 3:
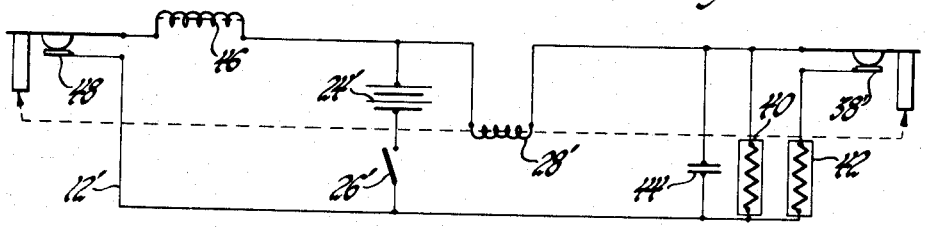
FIGURES 3 and 4 are circuit diagrams of further modifications of thermistor operated relay circuits according to the invention.
Figure 4:
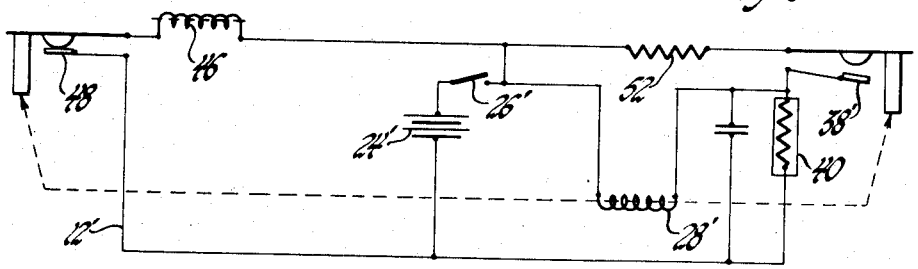

FIGURES 3 and 4 omit the heater circuit 10' although it is intended that such a circuit be coupled to circuit 12' as in FIGURE 2.

FIGURE 3 depicts a circuit the same as that of FIGURE 2 except that the two thermistors 40 and 42 are placed in parallel instead of in series. Then, in order to render one of the thermistors inoperative upon energization of the relay 28', it is placed in series with the normally closed relay contacts 38'. When the contacts 38' are closed, the two thermistors 40, 42 are in parallel. The net resistance of the pair, of course, is less than that of either one alone so that the resistance of the circuit will immediately increase when the contacts 38' are opened. Thus, as far as the operation of the relay 28' is concerned, the circuit 12' of FIGURE 3 is functionally about the same as the circuit 12' of FIGURE 2. There is one difference, however, due to the direct heating of the thermistors 42 and 44 by the current flowing therethrough. In the circuit of FIGURE 2, when the relay contacts 38' are closed and the temperature of the enclosure is rising, the current flowing through the first thermistor 40 is near its maximum and causes heating of the thermistor 40 which aids the heating effect from the ambient atmosphere of the enclosure, and when the contacts 38' are opened and the enclosure is cooling, the current through the first thermistor 40 is decreased so as to have less heating effect. Hence the direct heating of the thermistor narrows the temperature range thereby increasing the sensitivity of the circuit. The circuit of FIGURE 3, however, is arranged so that the current through the thermistor 40 is lower when the contacts 38' are closed than when the contacts 38' are opened so that during the cooling cycle, the increased current through the first thermistor will tend to slightly offset the effects of the cooling ambient atmosphere.

The circuit of FIGURE 4 is somewhat different from the previously described circuits in that only one thermistor 40 in series with the control relay 28' is used. In order to obtain the current change when the relay contacts 38' are opened or closed, a resistor 52 is connected across the relay coil 28' through the normally open relay contacts 38'. Thus it will be seen that in operation when the manual switch 26' is closed and the temperature rises, the current through the thermistor 40 and relay coil 28' will increase until the relay coil 28' is sufficiently energized to close the contacts 38' in series with the resistor 52. Then the voltage across the relay coil 28' will immediately drop since the net resistance of the resistor 52 and relay coil 28' is less than that of the relay coil alone. Like the circuit of FIGURE 3, the thermistor current is increased during the cooling cycle so that the self-heating of the thermistor will tend to buck the cooling effects of the atmosphere.

The invention then, as embodied in the above described circuits, provides a simple and reliable temperature control circuit which is very sensitive to temperature change and is especially suited for control systems where it is desirable to attain a narrow temperature control range at a relatively high temperature.

The above described embodiments of the invention are intended only as specific illustrations of the invention and are not to be taken as limiting the scope of the invention which is defined by the following claims:

I claim:

1. A temperature control circuit comprising a power supply, a first resistor and a relay coil in series therewith, said resistor being subject to the temperature to be controlled and having its value dependent thereon, said relay havings contacts opened at a first level of coil current and closed at a second level of coil current, and means for changing the coil current from one level to a value close to the other level upon actuation of the contacts including a second resistor across the relay contacts and in series with the first resistor.

2. A circuit as described in claim 1 wherein said resistors are thermistors.

3. A temperature control circuit comprising a power supply, a first resistor and a relay coil in series therewith, said resistor being subject to the temperature to be controlled and having its value dependent thereon, said relay having contacts opened at a first level of coil current and closed at a second level of coil current, and means for changing the coil current from one level to a value close to the other level upon actuation of the contacts including a second resistor across the first resistor and in series with the contacts.

4. A temperature control circuit comprising a power supply, a first resistor and a relay coil in series therewith, said resistor being subject to the temperature to be controlled and having its value dependent thereon, said relay having contacts opened at a first level of coil current and closed at a second level of coil current, and a second resistor and said relay contacts in series therewith connected across said relay coil whereby the coil current is changed from one level to a value close to the other level upon actuation of the contacts.

5. A thermally sensitive circuit responsive to the temperature of its ambient atmosphere, including a power source, a relay coil and a first resistor in series with said power source, the resistance of said resistor being primarily dependent upon the temperature of said atmosphere whereby the voltage across said relay coil and hence its energization is dependent upon the temperature of said atmosphere, a second resistor in series with said first resistor for further affecting the relay voltage, and normally closed relay contacts connected across said second resistor whereby the actuation of the relay contacts is effective to change the voltage across the relay coil.

6. A circuit as described in claim 5 wherein said resistors are thermistors.

7. A thermally sensitive circuit responsive to the temperature of its ambient atmosphere, including a power source, a relay coil and a first resistor in series with said power source, the resistance of said resistor being primarily dependent upon the temperature of said atmosphere whereby the voltage across said relay coil and hence its energization is dependent upon the temperature of said atmosphere, and a second resistor and normally closed relay contacts in series therewith connected across said first resistor, whereby the actuation of the relay contact is effective to change the voltage across the relay coil.

8. A thermally sensitive circuit responsive to the temperature of its ambient atmosphere, including a power source, a relay coil and a first resistor in series with said power source, the resistance of said resistor being primarily dependent upon the temperature of said atmosphere whereby the voltage across said relay coil and hence its energization is dependent upon the temperature of said atmosphere, and a second resistor and normally open relay contacts in series therewith connected across said relay coil, whereby the actuation of the relay contact is effective to change the voltage across the relay coil.

9. A temperature control system comprising a first circuit including a power supply, a first resistor and a relay coil in series therewith, said resistor being subject to the temperature to be controlled and having its value dependent thereon, said relay having contacts opened at a first level of coil current and closed at a second level of coil current, resistance means for changing the coil current from one level to a value close to the other level upon actuation of the contact, a second relay coil receiving current from said power supply, and normally closed contacts operable by the first said relay coil in series with said second coil; and a second circuit including in series a heat generating means, a power supply, and contacts operable by said second relay.

10. A temperature control system comprising a first circuit including a power supply, a first resistor and a relay coil in series therewith, said resistor being subject to the temperature to be controlled and having its value dependent thereon, said relay having contacts opened at a first level of coil current and closed at a second level of coil current, a second resistor in series with the first resistor and said relay contacts across said second resistor whereby the coil current is changed from one level to a value close to the other level upon actuation of the contacts, a second relay coil receiving current from said power supply, and normally closed contacts operable by the first said relay coil in series with said second coil; and a second circuit including in series a heat generating means, a power supply, and contacts operable by said second relay.

11. A temperature control system comprising a first circuit including a power supply, a first resistor and a relay coil in series therewith, said resistor being subject to the temperature to be controlled and having its value dependent thereon, said relay having contacts opened at a first level of coil current and closed at a second level of coil current, a second resistor and said contacts in series therewith connected across said first resistor whereby the coil current is changed from one level to a value close to the other level upon actuation of the contacts, a second relay coil receiving current from said power supply, and normally closed contacts operable by the first said relay coil in series with said second coil; and a second circuit including in series a heat generating means, a power supply, and contacts operable by said second relay.

12. A temperature control system comprising a first circuit including a power supply, a first resistor and a relay coil in series therewith, said resistor being subject to the temperature to be controlled and having its value dependent thereon, said relay having contacts opened at a first level of coil current and closed at a second level of coil current, a second resistor and said relay contacts in series therewith connected across said relay coil whereby the coil current is changed from one level to a value close to the other level upon actuation of the contacts, a second relay coil receiving current from said power supply, and normally closed contacts operable by the first said relay coil in series with said second coil; and a second circuit including in series a heat generating means, a power supply, and contacts operable by said second relay.

13. A temperature control system including a thermally sensitive circuit responsive to the temperature of its ambient atmosphere, including a power source, a relay coil and a first resistor in series with said power source, the resistance of said resistor being primarily dependent upon the temperature of said atmosphere whereby the voltage across said relay coil and hence its energization is dependent upon the temperature of said atmosphere, a second resistor for further affecting the relay voltage in said circuit, and relay contacts associated with said second resistor whereby the actuation of the relay contacts is effective to change the voltage across the relay coil; and a heating circuit having a heater controlled by current flow thereto in series with a power source and a second set of contacts operable by said relay.

14. A temperature control system including a thermally sensitive circuit responsive to the temperature of its ambient atmosphere, including a power source, a relay coil and a first resistor in series with said power source, the resistance of said resistor being primarily dependent upon the temperature of said atmosphere whereby the voltage across said relay coil and hence its energization is dependent upon the temperature of said atmosphere, a second resistor in series with said first resistor for further affecting the relay voltage, and normally closed relay contacts connected across said second resistor whereby the actuation of the relay contacts is effective to change the voltage across the relay coil; and a heating circuit having a heater controlled by current flow thereto in series with a power source and a second set of contacts operable by said relay.

15. A temperature control circuit comprising a power supply, a first thermistor and a relay coil in series therewith, said relay having contacts opened at a first level of coil current and closed at a second level of coil current, thermistor means for changing the coil current from one level to a value close to the other level upon actuation of the contact, said thermistor and thermistor means being subject to the temperature to be controlled and having their resistance values dependent thereon, and means for preventing vibration of the relay contacts including delay means in said circuit for preventing an abrupt current change.

16. A thermally sensitive circuit responsive to the temperature of its ambient atmosphere, including a power source, a relay coil and a first thermistor in series with said power source, the resistance of said thermistor being primarily dependent upon the temperature of said atmosphere whereby the voltage across said relay coil and hence its energization is dependent upon the temperature of said atmosphere, a second thermistor for further affecting the relay voltage in said circuit, the resistance of the second thermistor being dependent upon the temperature of said atmosphere, relay contacts associated with said second thermistor whereby the actuation of the relay contacts is effective to change the voltage across the relay coil, and means for preventing vibration of the relay contacts including delay means in said circuit for retarding the voltage change across the relay coil.

17. A thermally sensitive circuit responsive to the temperature of its ambient atmosphere, including a power source, a relay coil and a first thermistor in series with said power source, the resistance of said thermistor being primarily dependent upon the temperature of said atmosphere whereby the voltage across said relay coil and hence its energization is dependent upon the temperature of said atmosphere, a second thermistor in series with said first thermistor for further affecting the relay voltage, normally closed relay contacts connected across said second thermistor whereby the actuation of the relay contacts is effective to change the voltage across the relay coil, and capacitor means across the contacts to retard the voltage change.

18. A temperature control circuit comprising a power supply, two thermistors subject to the temperature to be controlled and having their values dependent thereon, a relay coil in series with one of the thermistors, the relay having contacts opened at a first level of coil current and closed at a second level of coil current, and resistance means including the other thermistor for changing the coil current from one level to a value close to the other level upon actuation of the contact.

References Cited in the file of this patent
UNITED STATES PATENTS

| | | |
|---|---|---|
| 1,225,388 | Woodbridge | May 8, 1917 |
| 2,229,432 | Amsden | Jan. 21, 1941 |
| 2,713,130 | Weiller | July 12, 1955 |
| 2,768,274 | Estes | Oct. 23, 1956 |
| 2,866,067 | Dolan et al. | Dec. 23, 1958 |
| 2,976,463 | Adams | Mar. 21, 1961 |